(No Model.)

E. F. JOHNSON.
WHEEL FOR ROLLER SKATES.

No. 301,606. Patented July 8, 1884.

WITNESSES:
John H. Deemer
C. Sedgwick

INVENTOR:
E. F. Johnson
BY Munn & Co.
ATTORNEYS.

UNITED STATES PATENT OFFICE.

EDWARD F. JOHNSON, OF JERSEY CITY, NEW JERSEY.

WHEEL FOR ROLLER-SKATES.

SPECIFICATION forming part of Letters Patent No. 301,606, dated July 8, 1884.

Application filed April 30, 1884. (No model.)

*To all whom it may concern:*

Be it known that I, EDWARD F. JOHNSON, of Jersey City, in the county of Hudson and State of New Jersey, have invented a new and Improved Wheel for Roller-Skates, of which the following is a full, clear, and exact description.

Reference is to be had to the accompanying drawings, forming part of this specification, in which similar letters of reference indicate corresponding parts in both the figures.

Figure 1:
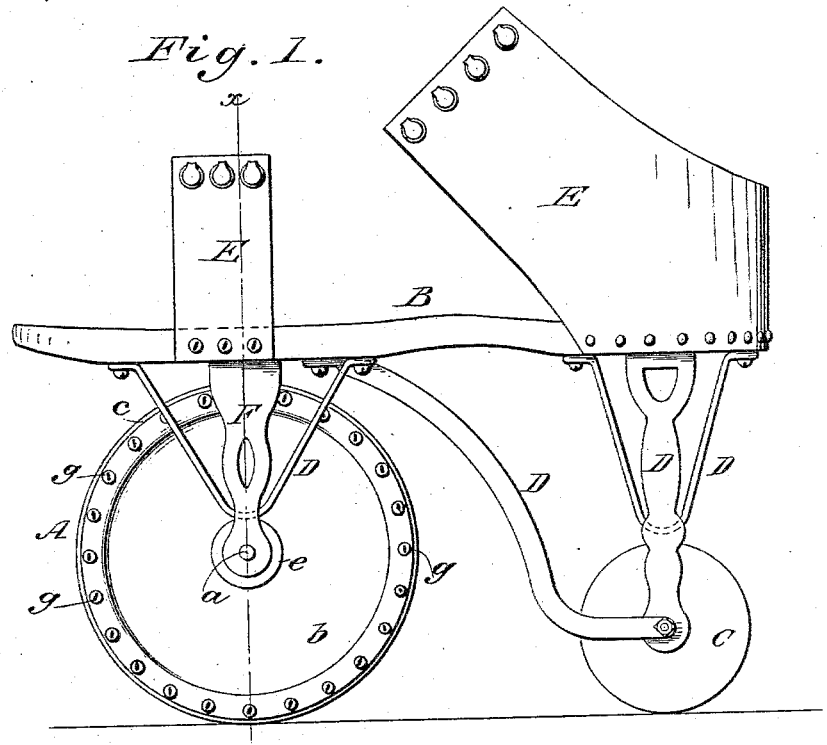
Figure 2:
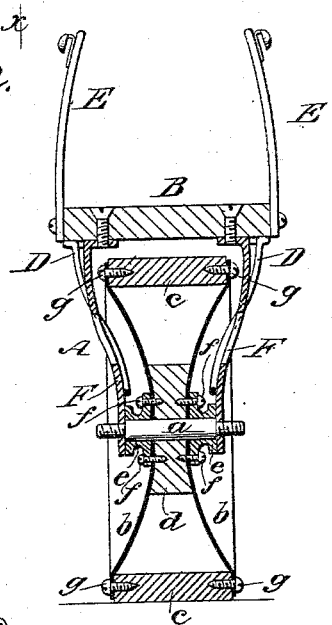

Figure 1 is a side elevation of a roller-skate having my new wheel applied thereto, and Fig. 2 is a sectional elevation taken on the line $x\,x$ of Fig. 1.

The invention will first be described in connection with the drawings, and then pointed out in the claims.

Referring to the drawings, the foot-piece B, rear wheel, C, braces D, and straps E may be of the ordinary or of any approved construction.

A represents my new wheel. This is attached to the foot-piece B by the side plates, F, screwed upon the ends of the shaft or axle $a$, upon which the wheel A turns. The wheel A is composed of the side metallic plates, $b\,b$, rim $c$, of sole-leather, central block, $d$, and side journals, $e\,e$, placed upon the axle $a$, and secured by the screws $f$, passed through the flanges of the journals and the side plates, $b$, and screwed into the central block, $d$, as shown clearly in Fig. 2. The side plates, $b$, are by preference made saucer-shaped, and they are secured at their edges to the edges of the leather rim $c$ by the series of screws $g$, which, after passing through the plates, screw directly into the sole-leather, so that the leather serves both as felly and tire to the wheel, making the wheel very light and cheap, and at the same time strong and durable.

Instead of using sole-leather for the rim $c$, heavy rubber or other flexible material may be used and not depart from the spirit of my invention.

Having thus described my invention, what I claim as new, and desire to secure by Letters Patent, is—

1. The combination, in a wheel, of the saucer-shaped side plates, $b$, central block, $d$, and leather rim $c$, substantially as and for the purposes set forth.

2. The saucer-shaped side plates, $b$, secured to the sole-leather rim $c$, in combination with the central block, $d$, and journals $e\,e$, secured to the plates $b$ and block $d$, substantially as shown and described.

EDWARD F. JOHNSON.

Witnesses:
  H. A. WEST,
  C. SEDGWICK.